United States Patent [19]

Morel et al.

[11] Patent Number: 4,914,795
[45] Date of Patent: Apr. 10, 1990

[54] MILL ROLL WITH A DEFORMABLE CASING

[75] Inventors: Michel Morel, Chelles; Marc Valence, Courbevoie, both of France

[73] Assignee: Clecim, Courbevoie, France

[21] Appl. No.: 154,253

[22] PCT Filed: Apr. 30, 1986

[86] PCT No.: PCT/FR86/00151
§ 371 Date: Dec. 28, 1987
§ 102(e) Date: Dec. 28, 1987

[87] PCT Pub. No.: WO87/06660
PCT Pub. Date: Nov. 5, 1987

[51] Int. Cl.⁴ .............................................. B21B 27/00
[52] U.S. Cl. ..................................... 29/116.2; 72/245
[58] Field of Search .............. 72/245; 29/116.2, 116.1, 29/110; 384/99, 100, 114, 115, 116; 100/162 B, 170

[56] References Cited

U.S. PATENT DOCUMENTS

| | | | |
|---|---|---|---|
| 4,394,793 | 7/1983 | Pau et al. | 29/116.2 |
| 4,404,724 | 9/1983 | Christ et al. | 29/116.2 |
| 4,514,887 | 5/1985 | Rauf et al. | 29/116.2 |
| 4,726,691 | 2/1988 | Lehmann | 29/116.2 |

*Primary Examiner*—Howard N. Goldberg
*Assistant Examiner*—Irene Cuda
*Attorney, Agent, or Firm*—Pollock, Vande Sande & Priddy

[57] ABSTRACT

A mill roll with a deformable casing comprises a tubular casing (1), a fixed support (2) and a set of elements (3) for holding the casing in the radial directions. At least one chamber (9) fed with high-pressure fluid is formed between the fixed support (2) and each of the holding elements (3). The end of the holding elements (3) is separated from the inner surface of the casing (1) by means of a fluid film occupying a zone (12) in the form of a sector of a ring. The zone (12) is in communication, at one of its ends, with a low-pressure fluid feed duct (14) and, at its other end, with a fluid recovery duct (15). This results in the formation of a hydrodynamic bearing during the rotation of the casing (1), which is fed completely independently of the high-pressure supply to the chamber (9).

7 Claims, 2 Drawing Sheets

MILL ROLL WITH A DEFORMABLE CASING

FIELD OF THE INVENTION

The invention relates to a mill roll with a deformable casing, of the type comprising a fixed support, a tubular casing and a set of elements for holding the casing in the radial direction.

BACKGROUND OF THE INVENTION

It has already been proposed to use such rolls with a deformable casing as back-up rolls in mill stands, for example of the four-high type, for the rolling of flat products. These rolls make it possible, for example, to carry out corrections of thickness and planeness on the flat product during rolling.

The elements for holding the tubular casing in the radial direction relative to the fixed support generally consist of jacks, the chamber of which is machined in or attached to the fixed support, and the rod of which has, at its end facing the inner surface of the casing, a sliding outer surface providing a space making it possible to form a film of fluid between the block and the tubular casing. The casing, during its rotation, can thus slide on the end of the element virtually without friction.

In conventional rolls with a deformable casing, the same pressurized fluid feeds the chamber of the jack and the chamber of the block in order to form the sliding fluid film. These two chambers are therefore in communication with one another via a duct in the rod of the jack.

The feed pressure of the chamber of the jack must to be adjusted and modulated according to the adjustment parameters of the mill stand. A hydraulic feed circuit possessing hydraulic or electro-hydraulic adjustment elements must therefore be provided. Such elements are limited to a pressure of at most 300 bars in their operating state.

As regards a mill used for the processing of products requiring high rolling forces, this feed pressure of the jacks may prove inadequate, with the result that, in some phases of the rolling process, the rods of the jacks may be brought up against the fixed support in their chamber, although this is not too serious because, momentarily, it simply becomes impossible to adjust the stand, but above all the fluid film between the element and the tubular casing may be flattened completely, thereby causing destructive friction between the tubular casing and the element or even the fixed support.

In more general terms, where the rolling of any flat product is concerned, momentary excess pressures can arise, especially at the instant when the strip enters the mill stand. If the pressure of the fluid film between the holding elements and the tubular casing itself is insufficient, it can happen that the casing, holding elements and fixed support may be brought in contact with one another and are subjected to wearing or destructive friction.

SUMMARY OF THE INVENTION

The object of the invention is, therefore, to provide a mill roll with a deformable casing, consisting of a fixed support, a tubular casing surrounding the support with some radial play and a set of elements for holding the tubular casing in the radial direction, in such a way that at least one hydraulic jack supplied with high-pressure fluid is interposed between the fixed support and each of the holding elements, the ends of which facing the inner surface of the tubular casing are separated from this casing by means of a fluid film occupying a space in the form of a circular sector of a ring and allowing the casing to rotate about the fixed support, this mill roll not having the disadvantages of prior art rolls when excess pressures attributable to an excessive rolling force occur.

To achieve this object, the space in the form of a circular sector between the fixed support and the holding elements is in communication, at one of its ends, with at least one low-pressure fluid feed duct and, at its other end, with at least one fluid recovery duct, in such a way that each of the holding elements forms a hydrodynamic bearing with the tubular casing during the rotation of the latter, and each of the jacks interposed between a holding element and the fixed support is connected to a high-pressure fluid source completely independent of the fluid supply to the corresponding hydrodynamic bearing.

BRIEF DESCRIPTION OF THE DRAWINGS

In order that the invention may be more clearly understood, several embodiments of a mill roll according to the invention, which can be used as a back-up roll in a mill stand for flat products, will now be described by way of examples, with reference to the accompanying drawings.

DESCRIPTION OF PREFERRED EMBODIMENTS

Figure 1:
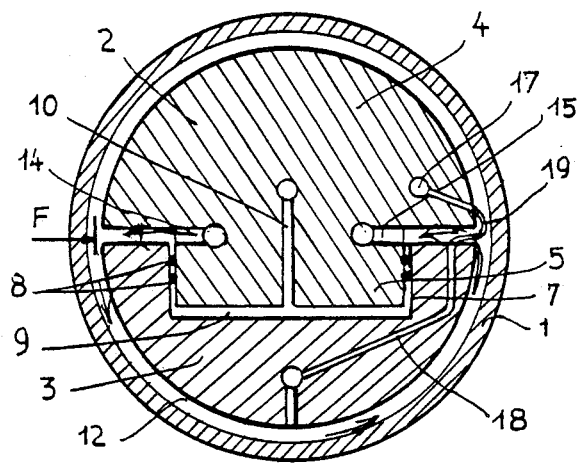
FIG. 1 is a cross-sectional view of a roll according to a first embodiment of the invention.

FIG. 1 shows a roll comprising a tubular casing 1, a fixed support 2 and a set of radial holding elements, such as 3. Three holding elements 3a, 3b and 3c, arranged in succession in the longitudinal direction of the roll, can be seen in FIG. 2 which shows a side view of the fixed support and holding elements.

The fixed support 2 is mounted at its ends in the frame of the stand and has a cylindrical upper part 4, the diameter of which is less than the inside diameter of the tubular casing 1. The lower part 5 of the fixed support 2 is machined so as to form three cylindrical pistons 5a, 5b, 5c of vertical axes, shown in FIG. 2.

The holding elements, 3a, 3b and 3c consist of portions of a cylinder, inside which are machined cylindrical receptacles 7 of a diameter slightly larger than the diameter of the pistons 5a, 5b and 5c.

Figure 3:
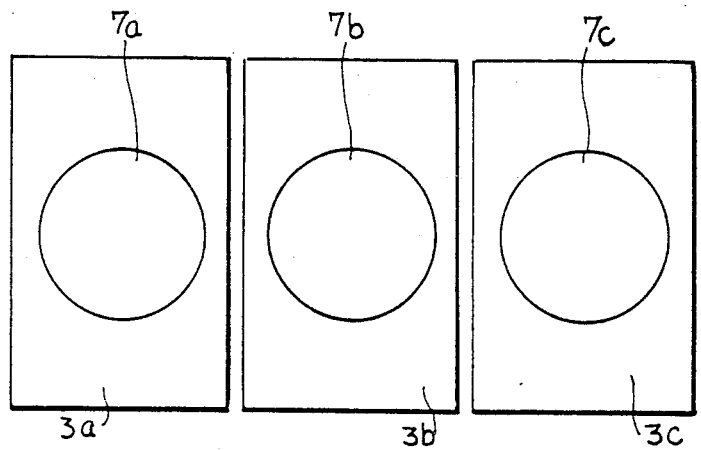
FIG. 3 is a pln view of the elements for holding the casing of the roll illustrated in FIGS. 1 and 2.

These receptacles 7a, 7b and 7c, which can be seen in FIG. 3, form the cylinders of the hydraulic holding jacks, the parts 5a, 5b and 5c of the fixed support 2 being the pistons of these. A set of gaskets 8 make it possible to mount the pistons 5 in the cylinders 7 in a sealed manner.

The holding elements 3 have an outside diameter slightly less than the outside diameter of the upper cylindrical part 4 of the fixed support 2. The shape of the elements 3 is determined in order to make it easier to produce the oil film. Between the end of the piston 5 and the bottom of the cylinder 7 there is a chamber 9 which is fed with hydraulic oil under high pressure via a duct 10.

The assembly comprising the support 2 and the holding elements 3 joined together as a result of the engagement of the pistons 5 in the cylinders 7 has a roughly cylindrical shape, the tubular casing 1 being mounted round this assembly, and the annular space of a certain thickness being maintained between the inner surface of the tubular casing 1 and the other surface of the assembly comprising the fixed support 2 and the holding elements 3.

This space, in its lower part, forms an angular sector 12 of an extent a little less than 180°. Ducts 14 and 15 machined in the fixed support 2 open out at the ends of this angular sector 12 contained between the tubular casing 1 and the holding elements 3. The ducts 14 and 15 open out just above the ends of the holding elements 3 in the form of sectors of a cylinder.

The ducts 14 are fed with low-pressure oil which flows into the angular sector 12 before being discharged via the corresponding ducts 15.

In the rolling mill in operation, the tubular casing 1 is rotated at high speed about the fixed support 2 and the holding elements 3. As a result of the circulation of hydraulic oil in the circular sector 12 between the inlet duct 14 and the discharge duct 15, a film of fluid is interposed between the inner surface of the tubular casing 1 and the outer surface of the holding elements 3.

The mill roll illustrated in FIG. 1, which, for example, can be an upper back-up roll in a four-high mill stand, receives rolling forces directed from the bottom upwards and transmitted to the holding elements 3 via the hydrodynamic fluid film circulating in the annular space 12.

The width of this space 12 tends to decrease under the effect of the rolling forces, but the pressure of the circulating fluid then increases so as to reach levels which can be of the order of several thousand bars where a four-high rolling mill is concerned.

The holding elements 3 form hydrodynamic bearings or blocks capable of transmitting extremely high rolling forces to the jacks consisting of the elements 5 and 7.

As regards a rolling force which momentarily becomes very high, because of the presence of the hydrodynamic bearing, there is no possibility of contact between the casing 1 and the holding element 3. On the contrary, the pressure in the chamber 9 of the jack is limited because the high-pressure fluid supplied via the duct 10 comes from a hydraulic control circuit, the operating pressure of which can reach 300 bars and even a little beyond this if there is no need for very accurate pressure regulation. However, in the event of a substantial momentary excess pressure, the piston 5 can come up against the bottom of the cylinder 7. This has no effect on the operation of the rolling mill, apart from the fact that it is momentarily no longer possible to make a correction of thickness or planeness.

Because of the presence of the hydrodynamic bearing, however, there is no fear of any destruction as a result of friction between the tubular casing 1 and the elements 3.

To prevent any possibility of accidental contact between the tubular casing 1 and the holding elements 3 in the event of a fault in the supply of low-pressure fluid to the hydrodynamic bearing via the duct 14 or if the tubular casing 1 ceases to rotate, there is an emergency high-pressure supply system for the space 12 in the form of a circular sector, comprising a duct 17 in the fixed support, a duct 18 in the radial holding element 3 and a flexible pipe 19 in the space formed between the tubular casing 1, on the one hand, and the fixed support 2 and holding elements 3, on the other hand.

Figure 4:
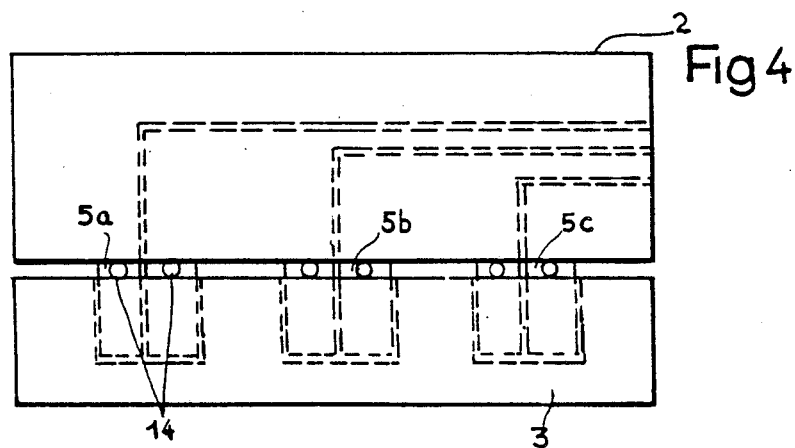
FIG. 4 is a view, similar to FIG. 2, of a second embodiment of th roll illustrated in FIGS. 1 to 3.

FIG. 4 shows an alternative embodiment of the assembly comprising the support 2 and the device 3 for holding the tubular casing.

The support 2 is produced in a form virtually identical to that described with reference to FIG. 2, but the holding device 3 is made in one piece, instead of consisting of three successive elements 3a, 3b and 3c.

Such a device, while being simpler to produce, limits the possible adjustments which can be made with the roll having a deformable casing. However, this device has the same advantages as the device described with reference to FIGS. 1 to 3, as regards resistance of the hydrodynamic liquid film to excess pressures during rolling.

The low-pressure fluid feed ducts 14 and the fluid recovery ducts 15 (not shown) must be distributed uniformly over the entire length of the roll, in order to prevent a lack of liquid of the hydrodynamic bearing at certain points. In the embodiment illustrated in FIG. 4, there are therefore two ducts 14 and two ducts 15 in the region of each of the pistons 5 machined in the fixed support 2.

Figure 6:
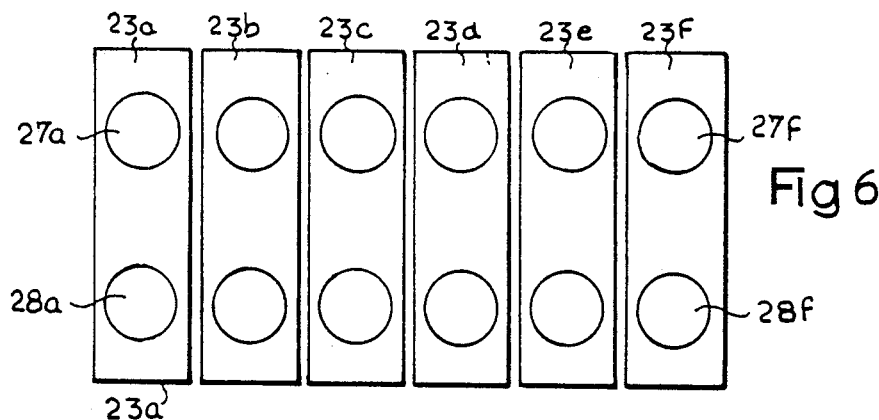
FIG. 6 is a plan view of the elements for holding the casing of the roll illustrated in FIG. 5.
Figure 5:
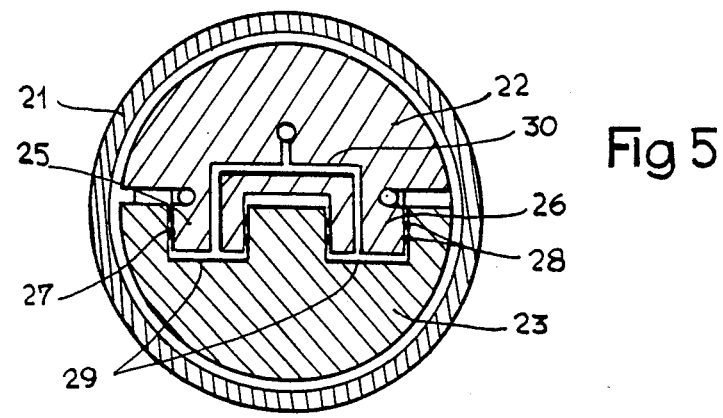
FIG. 5 is a cross-sectional view of a roll shown in FIG. 4.

FIGS. 5 and 6 show respectively a mill roll according to another embodiment and the holding and supporting elements of this roll.

As before, the tubular casing 21 of the roll is mounted with some radial play about the assembly comprising the fixed support 22 and the supporting elements 23 in the form of sectors of a cylinder.

Figure 2:
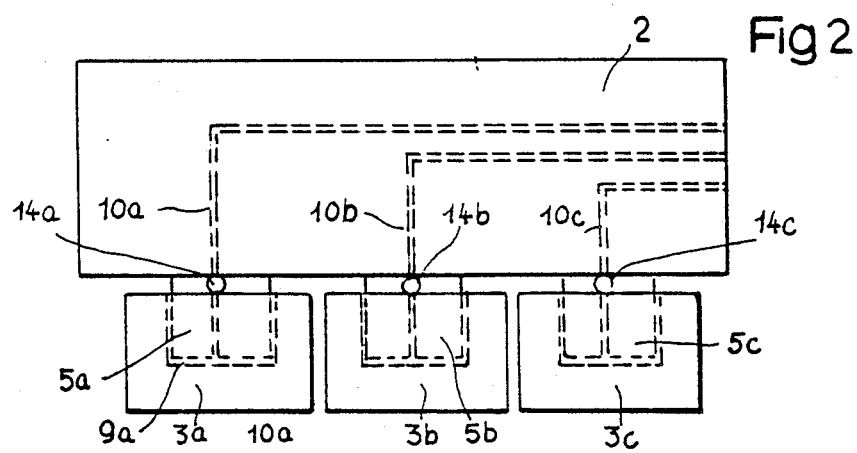
FIG. 2 is a side view of FIG. 1.

In contrast to the device illustrated in FIGS. 1 and 2, the support 2 of which had only a single piston 5 opposite each of the holding elements 3, the device shown in FIGS. 5 and 6 comprises a fixed support 22 which is machined to form two pistons 25 and 26 in the region of each of the holding elements 23.

It is thus possible to use a larger number of holding elements, of which a cross-section in a horizontal plane, as can be seen in FIG. 6, has the form of an elongate rectangle, while at the same time preserving a sufficient surface for the total cross-section of the cylinders 27 and 28 corresponding to the pistons 25 and 26.

The set of holding and supporting elements which is illustrated in FIG. 6 comprises six elements of elongate rectangular cross-section 23a to 23f, each comprising two cylinders 27a and 28a to 27f and 28f.

In fact, the total cross-section of the two cylinders 27 and 28 is larger than the total cross-section of the single cylinder of maximum diameter which can be accommodated in the cross-section of a supporting and holding element 23, as shown in FIG. 6.

Such holding and supporting elements can therefore withstand higher exceptional rolling forces. Such a device, comprising a larger number of holding elements, also allows more accurate adjustment of the shape of the deformable casing 21 of the roll and consequently a better control of the planeness and thickness of the flat product during rolling.

Thus, the main advantages of the mill roll according to the invention are that it is possible to transmit higher forces by means of the deformable casing, the liquid film and the holding elements and thus prevent contact between the deformable casing and the supplying elements or the fixed support. The mill roll according to the invention also makes it possible to increase the force exerted by the jacks, associated with each of the holding devices, for a cylinder using the same number of supporting devices arranged in succession in the longitudinal direction of the roll.

Instead of providing the pistons in the fixed support and the cylinders in the holding elements, it is possible to arrange the cylinders in the fixed support and the pistons in the holding elements.

It is also possible to have holding elements of square or any rectangular cross-section and possessing any number of cylinders or pistons arranged opposite corresponding elements in the fixed support.

Finally, the mill roll according to the invention is used not only for back-up rolls of a four-high rolling mill, but also for back-up rolls of a five-high or six-high rolling mill. The holding and supporting elements can be used not only for adjusting the planeness and thickness of a flat product, but also for other functions, such as the clamping of the stand, for example in order to control the tension of a strip of sheet metal.

We claim:

1. A milling roll with a deformable casing comprising
   (a) a fixed support (2) having an upper part (4) and a lower part (5);
   (b) a tubular casing (1) surrounding said support (2) with radial play and having a cylindrical inner surface;
   (c) a set of holding elements (3a, 3b, 3c) interposed between the lower part of the support (2) and an inner surface of said tubular casing (1);
   (d) each holding element (3a, 3b, 3c) having on one side thereof a cylindrical outer surface sliding on the inner surface of the tubular casing (1) and delimiting an annular space (12) in the form of an angular circular sector having two ends;
   (e) each holding element bearing on the other side thereof on the lower part of the fixed support (2) by means of at least one hydraulic jack (5, 7) having a chamber (9);
   (f) means (10) for feeding the chambers (9) of the hydraulic jacks (5, 7) of said holding elements (3) with high-pressure fluid, said means for feeding comprising a separate circuit (10a, 10b, 10c) for the jack (5, 7) of each holding element (3a, 3b, 3c);
   (g) means for pouring an hydraulic fluid film in the spaces (12) between the inner surface of the tubular casing (1) and the outer surface of each holding element (3), said means for pouring a fluid film comprising for each holding element (3a, 3b, 3c) means of circulating said fluid from one end of the space (12) in the form of a circular sector to the other end, said means comprising for each holding element (3a, 3b, 3c) (i) at least one feed duct (14) and at least one fluid recovery duct (15) opening out respectively at the two ends of the said space (12) in the form of a circular sector, said feed duct (14) being fed with low-pressure oil which flows in said space (12) so as to form a hydrodynamic bearing, in which the circulation of the fluid takes place completely independently of the supply of high-pressure fluid to the chamber (9) of the associated jack (5, 7).

2. A milling roll as claimed in claim 1, wherein each holding element (23) has the formm of an elongate rectangle in horizontal cross-section and is associated with at least two hydraulic jacks (25, 27) (26, 28) whose total cross-section is larger than the cross-section of a single jack of maximum diameter which can be accommodated in the elongate cross-section of the holding element (23).

3. A mill roll as claimed in claim 1, wherein each of the holding elements (3) carries at least one cylindrical piston whose position and dimension correspond to the position and dimension of a corresponding cylindrical receptacle machined in the fixed support (2).

4. A milling roll with a deformable casing comprising
   (a) a fixed support (2) having a upper part (4) and a lower part (5);
   (b) a cylindrical tubular casing (1) surrounding said support (2) with some radial play and having a cylindrical inner surface;
   (c) a single holding element (3) interposed between the lower part of the support (2) and the inner surface of said tubular casing (1) and extending over the entire length of the roll;
   (d) said holding element (3) having on one side a cylindrical outer surface sliding on the inner surface of the tubular casing (1) and delimiting an annular space (12) in the form of an angular circular sector having two ends;
   (e) said holding element bearing on the other side on the lower part of the fixed support (2) by means of a plurality of hydraulic jacks (5, 7), each having a chamber (9);
   (f) means (10) for feeding the chambers (9) of the hydraulic jacks (5, 7) of said holding elements (3) with high-pressure fluid, said means for feeding comprising a separate circuit (10a, 10b, 10c) for each jack (5, 7);
   (g) means for pouring an hydraulic fluid film in the annular space (12) between the inner surface of the tubular casing (1) and the outer surface of said holding element (3), said means for pouring a fluid film comprising circulation means for circulating the fluid from one end of the annular space (12) to the other end of the annular space, said circulation means comprising a plurality of feed ducts (14) and a plurality of recovery ducts (15) opening out respectively at the two ends of said annular circular space (12), said feed ducts (14) and recovery ducts (15) being uniformly distributed over the entire length of the roll;
   (h) said feed ducts (14) being fed with low-pressure oil which flows in said space (12) so as to form a hydrodynamic bearing, in which the circulation of the fluid takes place completely independently of the supply of high-pressure fluid to the chamber (9) of the associated jacks (5, 7).

5. A milling roll as claimed in claim 1 or 4, wherein each hydraulic jack comprises a piston (5a, 5b, 5c) machined in the lower part (5) of the fixed support (2) and engaging into a cylinder (7a, 7b, 7c) machined in the corresponding holding element (3a, 3b, 3c) (23).

6. A mill roll as claimed in any one of claims 1, 4 or 2, wherein each holding element (3, 23) has means for the emergency supply of high-pressure fluid to the annular circular sector (12) comprising a duct (18) formed in the holding element (3) and connected by means of a flexible pipe (19) to a high-pressure fluid feed duct (17) in the fixed support (2, 22).

7. A milling roll as claimed in any one of claims 1, 4, 2 or 3, wherein said space (12) covers a circular sector of slightly less than 180°.

* * * * *